3,328,400
CATALYZED PRODUCTION OF AZIDO TRIAZINES

Hermann Schulz and Werner Schwarze, Frankfurt am Main, Theodore Lussling, Hanau am Main, and Ewald Noll, Grosskrotzenburg, Germany, assignors to Deutsche Gold- und Silber-Scheideanstalt vormals Roessler, Frankfurt am Main, Germany
No Drawing. Filed May 4, 1964, Ser. No. 364,789
Claims priority, application Germany, Jan. 30, 1964, D 43,479
3 Claims. (Cl. 260—249.6)

The present invention relates to an improved process for the production of azido triazines of the formula

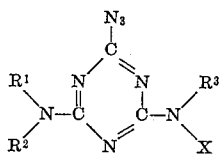

in which each of $R^1$, $R^2$, $R^3$ and X are hydrogen, lower alkyl or lower alkyl substituted with —OH, —$OR^6$, —SH, —$SR^6$, —Cl, —$NO_2$ or Br and X also can be

—CO—$NR^4R^5$, —$SO_2$—$NR^4R^5$, —$SO_2R^6$, —PO($NR^4R^5$)

or

—PS($NR^4R^5$)

in which each of $R^4$ and $R^5$ are hydrogen or lower alkyl and $R^6$ is lower alkyl.

Such azido triazines have already been described in co-pending application S.N. 286,187, filed June 7, 1963, now abandoned, and are useful for the extermination or selective suppression of weeds among cultivated plants or also for complete destruction or prevention of plant growth. According to such prior application the azido group (—$N_3$) is introduced by reacting the quaternary ammonium salts of the corresponding triazine derivatives with ammonium azide or an alkali metal azide whereby the group containing pentavalent nitrogen is replaced by the azido group.

A further process has also been described in copending application Ser. No. 364,809 entitled Production of Azido Triazines, filed May 4, 1964, whereby the azido group is introduced into the triazine compounds by reacting a compound of the formula

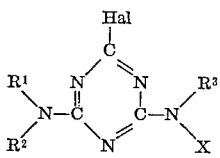

in which Hal is a chlorine or bromine atom and $R^1$, $R^2$, $R^3$ and X have the same significance as above with at least an equivalent quantity of an ammonium azide or alkali metal azide in the presence of an inert organic solvent at temperatures between about 20° C. and the boiling point of the solvent employed.

Dimethyl formamide, dimethyl acetamide, dimethyl sulfoxide, diethers of ethylene glycol or diethylene glycol, for example, can be used as the inert solvent.

According to the invention it has now been found that the azido triazines concerned could be produced in high yields and in pure form when the halo diamino triazines used as starting materials in the latter application are reacted with an ammonium or alkali metal azide when water or water containing a water miscible organic solvent is used as the solvent for the reaction and such reaction is carried out in the presence of at least a catalytic amount of a tertiary lower alkyl amine, preferably, trimethyl amine. Such water miscible solvents as acetone, dimethyl formamide, tetrahydrofuran, dioxane and especially water miscible alcohols such as methanol, ethanol, for example, come into consideration as the water soluble solvent which can be used in combination with water as the solvent medium for the reaction.

When the diamino-halo-triazine compound to be reacted is insoluble or difficultly soluble in pure water it is advisable to use an alcohol water mixture as the solvent medium for the reaction. All water soluble alcohols and especially methanol and ethanol can be employed in the reaction.

The reaction can be carried out at temperatures between about 20° C. and the boiling point of water or the water solvent mixture.

As has already been indicated, the tertiary amine must be present in at least catalytic quantities of, for example, from about 0.01 mol to 0.6 mol per mol of the diamino halo triazine. When smaller quantities of such tertiary amine are employed, longer reactions are required. For example, with 0.12 mol of trimethyl amine per mol of triazine, a reaction period of about 12.3 hours is required and with 0.6 mol of trimethyl amine, a reaction period of only 4.2 hours is required. Higher quantities of trimethyl amine, however, do not lead to a further shortening of the reaction period required.

The following examples will serve to illustrate the process according to the invention.

Example 1

11.5 kg. of 2-ethylamino-4-t-butylamino-6-chlorotriazine were homogenized by stirring with 34.5 kg. of methanol and 3.58 kg. of sodium azide in a 100 liter vessel. Thereafter 1.48 kg. of trimethyl amine dissolved in 11.5 kg. of water were added thereto at room temperature and the mixture then heated to 50° C. while stirring until the solution became clear. Subsequently the trimethyl amine and methanol were distilled off while slowly increasing the vacuum from 300 to 80 torr. The main quantity of methanol and trimethyl amine was recovered by direct condensation in a column containing filling bodies. The distillation residue contained 2-ethylamino-4-t-butylamino-6-azido-s-triazine suspended in water. The yield was 97.4%. After filtering off, washing and drying, its melting point was 101–102° C.

Example 2

293.7 g. of 2-isopropylamino-4-(N-diaminophosphinyl-N-ethyl)-amino-6-chloro-s-triazine together with 29.5 g. of trimethyl amine and 81.2 g. of sodium azide were suspended in 587.4 g. of water in a 2 liter round flask and stirred for 2 hours at 45° C. Thereafter the trimethyl amine was recovered by distillation under vacuum. The distillation residue contained the azido compound produced suspended in water. After filtering off such azido compound, washing and drying at 50° C. under reduced pressure, 227 g. of 2-isopropylamino-4-(N-diaminophosphinyl-N-ethyl)-amino-6-azido-s-triazine of 99% purity with a melting point of 156–157° C. were obtained.

We claim:
1. A method for the production of an azido triazine of the formula

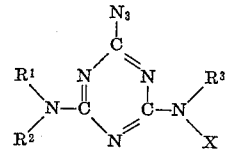

wherein each of $R^1$, $R^2$ and $R^3$ are selected from the group consisting of hydrogen and lower alkyl and X is selected from the group consisting of hydrogen, lower alkyl, —CO—NR$^4$R$^5$, —SO$_2$NR$^4$R$^5$, —SO$_2$—R$^6$, —PO(NR$^4$R$^5$) and —PS(NR$^4$R$^5$) wherein R$^4$ and R$^5$ are each selected from the group consisting of hydrogen and lower alkyl and R$^6$ is lower alkyl which comprises reacting a compound of the formula

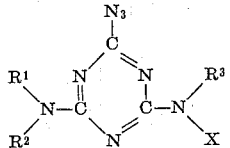

wherein Hal is selected from the group consisting of chlorine and bromine and R$^1$, R$^2$, R$^3$ and X have the same significance as above with at least an equivalent amount of an azide selected from the group consisting of ammonium azide and alkali metal azide in an aqueous solvent selected from the group consisting of water and mixtures of water with water miscible organic solvents in contact with at least a catalytic amount of trimethyl amine.

2. The process of claim 1 in which said aqueous medium is an aqueous lower alkanol.

3. The process of claim 1 in which the quantity of said trimethyl amine is 0.01 to 0.6 mol per mol of the diamino halo triazine.

References Cited

UNITED STATES PATENTS

| | | | |
|---|---|---|---|
| 3,079,403 | 2/1963 | Weinstock et al. | 260—349 |
| 3,122,570 | 2/1964 | Stansbury et al. | 260—349 |
| 3,212,844 | 10/1965 | Washburn | 260—349 |
| 3,232,958 | 2/1966 | Washburn | 260—349 |

OTHER REFERENCES

Boyer et al.: Chem. Reviews, vol. 54 (1954), pp. 1–9.

WALTER A. MODANCE, *Primary Examiner.*

J. M. FORD, *Assistant Examiner.*